US012747043B1

(12) United States Patent
Sherman

(10) Patent No.: US 12,747,043 B1
(45) Date of Patent: Sep. 29, 2026

(54) ROTATIONAL TAKE-OFF AND LANDING OF AERIAL VEHICLES

(71) Applicant: Tristan Sherman, Wrightwood, CA (US)

(72) Inventor: Tristan Sherman, Wrightwood, CA (US)

( * ) Notice: Subject to any disclaimer, the term of this patent is extended or adjusted under 35 U.S.C. 154(b) by 36 days.

(21) Appl. No.: 19/094,868

(22) Filed: Mar. 29, 2025

(51) Int. Cl.
*B64U 70/80* (2023.01)
*B64C 37/02* (2006.01)

(52) U.S. Cl.
CPC .............. *B64U 70/80* (2023.01); *B64C 37/02* (2013.01)

(58) Field of Classification Search
CPC .......... B64C 37/02; B64U 70/80; B64D 3/00; B64D 5/00
See application file for complete search history.

(56) References Cited

U.S. PATENT DOCUMENTS 1,181,784 A * 5/1916 McCurry ................ B64C 27/82 244/17.19
2,298,912 A 10/1942 Francois
2,373,086 A 4/1945 Francois
3,226,056 A * 12/1965 Holland, Jr. ............ B64C 37/02 244/2
4,416,436 A 11/1983 Wilson
5,074,489 A * 12/1991 Gamzon .................. B64D 1/22 244/114 R
5,088,663 A * 2/1992 Henson .................. B64G 1/005 244/137.4
6,264,140 B1 7/2001 McGeer et al.
8,061,646 B2 * 11/2011 Gomez ................. B64C 23/076 244/199.3
8,191,818 B2 * 6/2012 Larkin ..................... B64D 5/00 244/172.4
8,308,142 B1 * 11/2012 Olson ...................... B64D 3/00 244/137.1
8,931,727 B2 * 1/2015 Engblom ............... G05D 1/105 244/900
8,973,860 B2 * 3/2015 Beard .................... B64U 10/25 244/1 TD
9,193,481 B2 11/2015 Mcgeer et al.
9,623,949 B2 * 4/2017 Heppe ..................... B64C 37/02
9,944,410 B1 4/2018 Budd
10,144,511 B2 12/2018 Von Flotow
(Continued)

FOREIGN PATENT DOCUMENTS

EP 3680181 7/2020

*Primary Examiner* — Joseph W Sanderson
(74) *Attorney, Agent, or Firm* — Lewis M Brande; Law Office of Lewis Brande

(57) ABSTRACT

The present disclosure describes a system having a first aerial vehicle and a second aerial vehicle. The first aerial vehicle and the second aerial vehicle are configured to couple with each other and perform a rotational take-off and a rotational landing about a vertical axis. The system further includes a first connector having a first connector proximal end and a first connector distal end. The first proximal end is attached to the first aerial vehicle. The system further includes a second connector having a second connector proximal end and a second connector distal end. The second proximal end is attached to the second aerial vehicle. The first aerial vehicle and the second aerial vehicle are configured to be coupled to each other via the first connector distal end and the second connector distal end.

14 Claims, 6 Drawing Sheets

(56) References Cited

U.S. PATENT DOCUMENTS

| | | | | |
|---|---|---|---|---|
| 10,293,934 | B2 | 5/2019 | Christensen | |
| 10,329,015 | B2 * | 6/2019 | DeBey | B64D 3/00 |
| 10,538,323 | B2 * | 1/2020 | Rancourt | B64C 19/02 |
| 10,807,709 | B2 * | 10/2020 | Selfridge | B64U 10/60 |
| 11,192,645 | B2 * | 12/2021 | Selfridge | B64C 37/02 |
| 11,203,427 | B2 * | 12/2021 | Selfridge | B64U 10/60 |
| 11,365,002 | B2 * | 6/2022 | Selfridge | B64C 37/02 |
| 11,628,955 | B2 * | 4/2023 | Selfridge | B64U 30/10 244/158.2 |
| 2009/0127376 | A1 * | 5/2009 | Gomez | B64U 10/25 244/2 |
| 2009/0127387 | A1 * | 5/2009 | Larkin | B64D 5/00 455/99 |
| 2011/0006151 | A1 * | 1/2011 | Beard | B64D 3/00 244/3 |
| 2012/0232721 | A1 * | 9/2012 | Engblom | B64C 37/02 701/3 |
| 2012/0234964 | A1 * | 9/2012 | Heppe | B64U 50/34 244/30 |
| 2014/0008490 | A1 * | 1/2014 | Beard | B64D 3/00 244/110 F |
| 2014/0097301 | A1 * | 4/2014 | DeBey | B64C 37/02 244/73 R |
| 2017/0129600 | A1 * | 5/2017 | Rancourt | B64C 19/02 |
| 2018/0229838 | A1 * | 8/2018 | Selfridge | B64U 10/60 |
| 2019/0344887 | A1 * | 11/2019 | Selfridge | B64U 10/60 |
| 2020/0094955 | A1 * | 3/2020 | Selfridge | B64U 10/60 |
| 2020/0094956 | A1 * | 3/2020 | Selfridge | B64C 37/02 |
| 2021/0086895 | A1 * | 3/2021 | Selfridge | B64C 37/02 |
| 2022/0063841 | A1 * | 3/2022 | Selfridge | B64U 30/20 |

* cited by examiner

ROTATIONAL TAKE-OFF AND LANDING OF AERIAL VEHICLES

TECHNICAL FIELD

The present invention relates generally to aerial vehicles, and more specifically to rotational take-off and landing of aerial vehicles.

BACKGROUND OF THE INVENTION

It is known that unmanned aerial vehicles are capable of being remotely controlled and enable autonomous flight operations. An unmanned aerial vehicle may be used for a variety of purposes/missions including surveillance, intelligence, rescue, and other missions. Different aerial vehicles may have different endurance times (e.g., 20, 30, or 40 hours) depending on their configurations. Such aerial vehicles may be remotely piloted by operators who control the vehicles from a ground control station. The operators may guide the aerial vehicles through the necessary procedures to achieve a lift-off, and to complete the mission.

Typically, such aerial vehicles may take-off from a short runway. There exist various mechanisms that enable the aerial vehicles to take-off from the ground over short distances. For instance, an aerial vehicle may include a Short Takeoff and Landing (STOL) system that may enable the aerial vehicle to reach the take-off speed quickly on the ground. When the aerial vehicle reaches the take-off speed, the aerial vehicle may climb to the desired flight altitude.

Sometimes, the conventional runway may not be available for the aerial vehicles to takeoff. In such instances, it may be challenging for the aerial vehicles to take-off (or land). Accordingly, there is a need for a system and method that enables the aerial vehicles to take-off and land even when the conventional runway is unavailable.

SUMMARY OF THE INVENTION

The following presents a simplified summary of the present disclosure in a simplified form as a prelude to the more detailed description that is presented herein.

In accordance with embodiments of the invention, there is provided a system having a first aerial vehicle and a second aerial vehicle. The system may further include a first connector and a second connector. The first connector may include a first connector proximal end and a first connector distal end. The first connector proximal end may be attached to the first aerial vehicle. The second connector may include a second connector proximal end and a second connector distal end. The second connector proximal end may be attached to the second aerial vehicle. In some aspects, the first aerial vehicle and the second aerial vehicle may be configured to be coupled to each other via the first connector distal end and the second connector distal end. The first aerial vehicle and the second aerial vehicle may be configured to be coupled to each other to perform a rotational take-off and a rotational landing about a vertical axis.

In some aspects, the system may further include a first processor associated with the first aerial vehicle and a second processor associated with the second aerial vehicle. The first processor and the second processor are configured to obtain a first instruction to perform the rotational take-off of the first aerial vehicle and the second aerial vehicle, and cause/instruct, responsive to obtaining the first instruction, the first aerial vehicle and the second aerial vehicle to perform a rotational motion in which the first aerial vehicle and the second aerial vehicle rotate about one another on ground until a take-off speed has been achieved, while the first aerial vehicle and the second aerial vehicle are coupled.

In further aspects, the first processor and the second processor are configured to instruct the first aerial vehicle and the second aerial vehicle to continue the rotational motion and climb to a desired flight altitude subsequent to the take-off speed being achieved. In further aspects, the first processor and the second processor will allow the first aerial vehicle and the second aerial vehicle to remain coupled until the first aerial vehicle and the second aerial vehicle have climbed to the desired flight altitude.

In further aspects, the first processor and the second processor are configured to instruct the first aerial vehicle and the second aerial vehicle to decouple after the first aerial vehicle and the second aerial vehicle have climbed to the desired flight altitude. The first connector and the second connector are then disconnected causing the first aerial vehicle and the second aerial vehicle to become decoupled. The first processor and the second processor are further configured to cause/instruct the first connector distal end to retract towards the first aerial vehicle and the second connector distal end to retract towards the second aerial vehicle after the first connector and the second connector are disconnected.

The first processor and the second processor are further configured to allow/instruct the first aerial vehicle and the second aerial vehicle to transition from the rotational motion about each other to an independent, uncoupled, and non-rotational forward motion when the first connector and the second connector may be disconnected that is either pre-programmed into the first and second processors, or are independently controlled. In other aspects, the first processor and the second processor may be configured to cause/instruct the first aerial vehicle and the second aerial vehicle to remain coupled after the first aerial vehicle and the second aerial vehicle climb to the flight altitude, and transition from the rotational motion to a non-rotational forward motion while the first connector and the second connector may be connected.

In further aspects, the first processor and the second processor are configured to obtain a second instruction to perform the rotational landing, and cause/instruct the first connector distal end and the second connector distal end to reconnect, responsive to obtaining the second instruction. The first processor and the second processor may cause/instruct the first aerial vehicle and the second aerial vehicle to transition from the independent, uncoupled, and non-rotational forward motion to the rotational motion in which the first aerial vehicle and the second aerial vehicle rotate about one another and about the vertical axis, and allow a controlled descend of the first aerial vehicle and the second aerial vehicle to the landing site or ground to complete the rotational landing.

The present disclosure is further directed towards a first aerial vehicle that would include a first connector having a first connector proximal end and a first connector distal end. The first connector proximal end is attached to the first aerial vehicle, and the first connector distal end would be configured to be attached to a second connector of a second aerial vehicle. The second aerial vehicle may be different from the first aerial vehicle. The first aerial vehicle and the second aerial vehicle would be configured to be coupled with each other, via the first connector and the second connector, to perform a rotational take-off and a rotational landing about a vertical axis.

In some aspects, the second connector could include a second connector proximal end and a second connector distal end. The second connector proximal end is attached to the second aerial vehicle. The second connector distal end would be configured to be attached to the first connector distal end to enable the first aerial vehicle and the second aerial vehicle to be coupled with each other. Stated another way, the first aerial vehicle and the second aerial vehicle may be coupled to each other via the first connector distal end and the second connector distal end. In some aspects, the first connector and the second connector may be cables or wires. In further aspects, the first connector and the second connector may include a fixed structure. In some aspects, the fixed structure may be a rigid or inflexible structure.

In some aspects, the first aerial vehicle will include a processor (e.g., a first processor) that is configured to receive a first instruction to perform the rotational take-off, and cause/instruct, responsive to receiving the first instruction, the first aerial vehicle to perform the rotational take-off when the first aerial vehicle is coupled with the second aerial vehicle. The processor is further configured to receive a second instruction to perform the rotational landing, and cause/instruct, responsive to receiving the second instruction, the first aerial vehicle to perform the rotational landing while the first aerial vehicle is coupled with the second aerial vehicle.

The present disclosure is further directed towards a method to perform a rotational takeoff. The method may include positioning, by one or more processors, a first aerial vehicle in a first direction and a second aerial vehicle in a second direction. The first direction may be opposite to the second direction. The method further includes coupling the first aerial vehicle and the second aerial vehicle via a first connector and a second connector when the first aerial vehicle is positioned in the first direction and the second aerial vehicle is positioned in the second direction. The first connector may be associated with the first aerial vehicle and the second connector be associated with the second aerial vehicle. The method may further include allowing the first aerial vehicle and the second aerial vehicle to rotate about one another about a vertical axis on ground until a take-off speed has been achieved, and then causing/instructing the first aerial vehicle and the second aerial vehicle to climb to a desired flight altitude after the take-off speed has been achieved. The method further includes an instruction causing/instructing the decoupling of the first aerial vehicle and the second aerial vehicle when the first aerial vehicle and the second aerial vehicle climb to the desired flight altitude.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION

Figure 1:
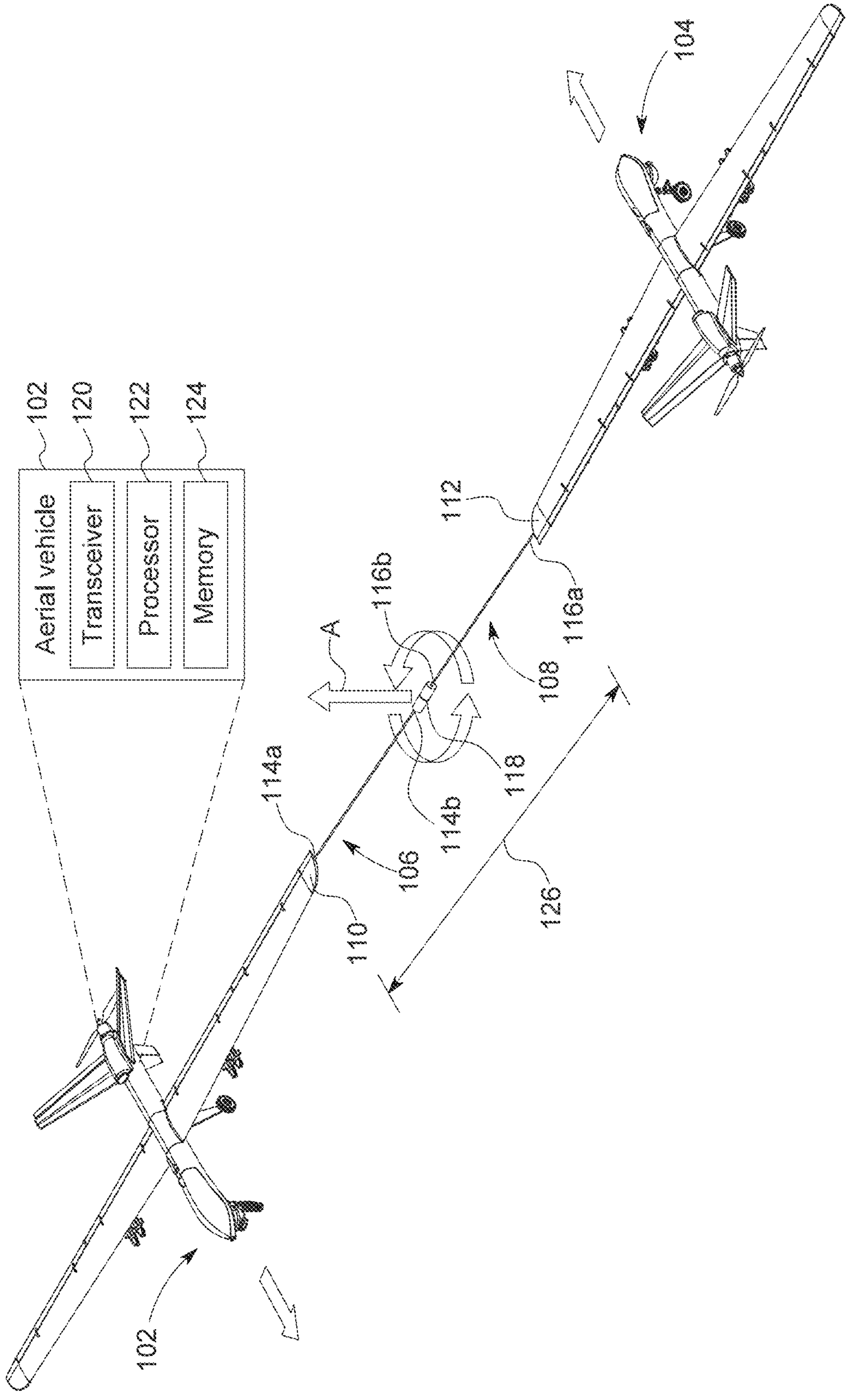
FIG. 1 is a first view of coupling of a first aerial vehicle and a second aerial vehicle for a rotational take-off, in accordance with the present disclosure.

A further understanding of the nature and function of the embodiments, are provided by the following detailed description. Detailed descriptions of the preferred embodiments are provided, as well as, the best mode of carrying out and employing the present invention. It will be readily understood that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 is a first view of coupling of a first aerial vehicle 102 and a second aerial vehicle 104 for a rotational take-off, in accordance with the present disclosure. FIG. 1 will be explained in conjunction with FIGS. 2-4.

The first aerial vehicle 102 and the second aerial vehicle 104 may be autonomous unmanned aerial vehicles or remotely controlled unmanned aerial vehicles, controlled by one or more operators (not shown) from a ground control station. The operators may control the take-off of the first aerial vehicle 102 and the second aerial vehicle 104, and may guide the first aerial vehicle 102 and the second aerial vehicle 104 to perform their respective missions such as surveillance, intelligence, rescue, and/or other missions. The mission associated with the first aerial vehicle 102 may be the same as or different from the mission associated with the second aerial vehicle 104. The first aerial vehicle 102 and the second aerial vehicle 104 may include a variety of payloads to meet their respective mission requirements, which may include sensors, cameras, mission-specific equipment, and/or the like. In further aspects, the first aerial vehicle 102 and the second aerial vehicle 104 may have high endurance times (e.g., up to 40 hours), and may be capable of operating at high altitudes (e.g., up to 50,000 feet). In some aspects, the configuration (e.g., hardware and/or software specification) of the first aerial vehicle 102 may be the same as the configuration of the second aerial vehicle 104. In other aspects, the configuration of the first aerial vehicle 102 may be different from the configuration of the second aerial vehicle 104.

In some aspects, the first aerial vehicle 102 and the second aerial vehicle 104 may be configured to be coupled with each other to form a single coupled/paired system. In some aspects, the first aerial vehicle 102 and the second aerial vehicle 104 may be coupled to perform a rotational take-off and a rotational landing about a vertical axis "A" (i.e., an axis perpendicular to the ground surface). Specifically, the first aerial vehicle 102 and the second aerial vehicle 104 may be coupled to each other and may move in a circular rotational motion (clockwise or counter-clockwise) about the vertical axis "A", which will allow the coupled vehicles to perform the take-off or the landing. Stated another way, the first aerial vehicle 102 and the second aerial vehicle 104 may perform the take-off or landing while the first aerial vehicle 102 and the second aerial vehicle 104 may be in the rotational motion about the vertical axis "A" and connected to each other. Such coupling of the first aerial vehicle 102 and the second aerial vehicle 104 and the rotational motion of the coupled/paired system about the vertical axis "A" enable the first aerial vehicle 102 and the second aerial vehicle 104 to perform the actions of take-off or landing without requiring a conventional straight line runway. With this understanding, the first and second aerial vehicles 102, 104 may be able to take-off or land by using the coupling process and the rotational motion about the vertical axis as described in the present disclosure. This can be accomplished even when a conventional runway may not be available. The first aerial vehicle 102 and the second aerial vehicle 104 may be coupled to perform the rotational take-off and landing in a stable manner, as opposed to the conventional linear takeoff/landing. The "coupled" system of the first and second aerial vehicles 102, 104 and the rotational motion (e.g., the rotational take-off and the rotational landing) about the vertical axis "A" allows two independent and "unstable" aerial vehicles (e.g., the first aerial vehicle 102 and the second aerial vehicle 104) to become stable by using centrifugal forces and rotation.

The first aerial vehicle 102 may include a first connector 106 and the second aerial vehicle 104 may include a second connector 108. The first aerial vehicle 102 and the second aerial vehicle 104 may be coupled to each other via the first connector 106 and the second connector 108. In an exemplary embodiment, the first connector 106 and the second connector 108 may be a cable or include a cable to couple the first aerial vehicle 102 and second aerial vehicle 104. Alternatively, the first connector 106 and the second connector 108 may be or include any fixed structure (having energy absorbing capability) for localized connection. In some aspects, the first aerial vehicle 102 and the second aerial vehicle 104 may be connected side by side. For instance, the first connector 106 may be attached to the first aerial vehicle 102 at a first wingtip 110 of the first aerial vehicle 102. Similarly, the second connector 108 may be attached to the second aerial vehicle 104 at a second wingtip 112 of the second aerial vehicle 104. In alternative aspects, the first connector 106 and the second connector 108 may be attached to the respective first aerial vehicle 102 and the second aerial vehicle 104 at any other position provided that the position will allow for stable coupled rotational flight around the first and second aerial vehicle 102, 104. The use of the first connector 106 and the second connector 108 enables the first aerial vehicle 102 and the second aerial vehicle 104 to work cooperatively as a single paired (coupled) system to enable the rotational takeoff and the rotational landing.

The first connector 106 may include a first connector proximal end 114*a* and a first connector distal end 114*b*. Similarly, the second connector 108 may include a second connector proximal end 116*a* and a second connector distal end 116*b*. The first connector proximal end 114*a* may be connected to the first aerial vehicle 102, and the second connector proximal end 116*a* may be connected to the second aerial vehicle 104. The first connector distal end 114*b* may be coupled to the second connector distal end 116*b* (e.g., at a connection point 118) to couple the first aerial vehicle 102 and the second aerial vehicle 104. Stated another way, the first aerial vehicle 102 and the second aerial vehicle 104 may be coupled to each other by attaching the first connector distal end 114*b* and the second connector distal end 116*b*. In further aspects, the first connector distal end 114*b* and the second connector distal end 116*b* may include a coupling and decoupling mechanism (not shown) that enables the coupling/decoupling of the first aerial vehicle 102 and the second aerial vehicle 104 via the respective first and second connector distal ends 114*b*, 116*b*.

The first connector 106 (e.g., the first connector proximal end 114*a*) may be attached to any portion of the first aerial vehicle 102, and the second connector 108 (e.g., the second connector proximal end 116*a*) may be attached to any portion of the second aerial vehicle 104. In some aspects, the first connector 106 (e.g., the first connector proximal end 114*a*) may be attached to the first aerial vehicle 102 at the first wingtip 110 of the first aerial vehicle 102. Similarly, the second connector 108 (e.g., the second connector proximal end 116*a*) may be attached to the second aerial vehicle 104 at the second wingtip 112 of the second aerial vehicle 104. The first connector 106 and the second connector 108 may be attached to the first aerial vehicle 102 and the second aerial vehicle 104, respectively, by using any connection mechanism including, but not limited to, a fastener, an adhesive, a magnetic coupling device, and/or the like.

In some aspects, the connection point 118 (at which the first connector distal end 114*b* and the second connector distal end 116*b* are connected), may be located at a small distance away from the first aerial vehicle 102 and the second aerial vehicle 104 (when the first aerial vehicle 102 and the second aerial vehicle 104 may be in an orientation being ready for take-off, described later in the description below). For instance, the connection point 118 may be located at a point between the first wingtip 110 and the second wingtip 112. In further aspects, the lengths of the first connector 106 and the second connector 108 may be equivalent to each other. In an exemplary embodiment, a sum of the lengths of the first connector 106 and the second connector 108 may be equivalent to a gap (e.g., a gap 126) between the first wingtip 110 and the second wingtip 112 in the take-off position. In effect, the optimal situation is when the vertical axis is equidistant from the first wingtip 110 and the second wingtip 112.

In some aspects, each the first aerial vehicle 102 and the second aerial vehicle 104 may include a plurality of components including, but not limited to, a transceiver 120, a processor 122, and a memory 124. The transceiver 120 may be configured to transmit or receive information and/or instructions to or from the ground control station. For instance, the transceiver 120 may be configured to receive instructions for take-off or landing. Similarly, the transceiver 120 may transmit images by the aerial vehicle's cameras (e.g., images associated with the surveillance) to the ground control station. In addition, the transceiver 120 may be used to communicate data/information with other aerial vehicles. An example would be that the transceiver associated with the first aerial vehicle 102 would exchange data and/or information with a transceiver associated with the second aerial vehicle 104.

The memory 124 may store programs in code and/or store data for performing various operations in accordance with the present disclosure. The processor 122 may be configured and/or programmed to execute computer-executable instructions stored in the memory 124 for performing various functions in accordance with the present disclosure. Consequently, the memory 124 may be used for storing code and/or data code and/or data for performing operations in accordance with the present disclosure.

In one or more embodiments, the processor 122 may be disposed in communication with one or more memory devices (e.g., the memory 124 and/or one or more external databases (not shown in FIG. 1)). The memory 124 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The memory 124 is one example of a non-transitory computer-readable medium and stores programs in code and/or stores data for performing various operations in accordance with the disclosure. The instructions in the memory 124 can include one or more separate programs, each of which can include an ordered listing of computer-executable instructions for implementing logical functions.

In operation, the first aerial vehicle 102 and the second aerial vehicle 104 may be positioned in a take-off position. In the take-off position, the first aerial vehicle 102 and the second aerial vehicle 104 are generally positioned in opposite directions, and maintain a small gap 126 between the first aerial vehicle 102 and the second aerial vehicle 104. In some aspects, the first aerial vehicle 102 may be positioned in a first direction and the second aerial vehicle 104 may be positioned in a second direction, where the first direction is opposite to the second direction (e.g., 180 degrees offset relative to each other). In some aspects, the gap 126 may be equivalent to the sum of the lengths of the first connector 106 and the second connector 108.

When the first aerial vehicle 102 and the second aerial vehicle 104 are positioned in. opposite directions, the first aerial vehicle 102 and the second aerial vehicle 104 will be coupled with each other by using the first connector 106 and the second connector 108. In particular, the first connector distal end 114*b* may be connected to the second connector distal end 116*b*, to form the connection point 118. When the first aerial vehicle 102 and the second aerial vehicle 104 are positioned in the take-off position (i.e., aligned in the opposite directions and coupled via the first connector 106 and the second connector 108), an operator at the ground control station will remotely initiate the rotational take-off operation of the first aerial vehicle 102 and the second aerial vehicle 104. In some aspects, the first aerial vehicle 102 and the second aerial vehicle 104 are controlled by the same operator, and in other aspects the first aerial vehicle 102 and the second aerial vehicle 104 are controlled by different operators by transmitting (via the ground control station) command signals and/or instructions to the first and second aerial vehicles 102, 104.

In some aspects, the processor 122 (associated with the first aerial vehicle 102 and the second aerial vehicle 104) may obtain instructions (e.g., a first instruction) to perform a take-off operation from the ground control station when the operator initiates the take-off operation. Responsive to obtaining the instructions, the processor 122 would cause/instruct the first aerial vehicle 102 and the second aerial vehicle 104 to move in the take-off position (e.g., in the first direction and the second direction and maintain the gap 126). When the first aerial vehicle 102 and the second aerial vehicle 104 are in the take-off position, the processor 122 would drive automatic coupling of the first aerial vehicle 102 and the second aerial vehicle 104 via the first connector 106 and the second connector 108.

In further aspects, when the first aerial vehicle 102 and the second aerial vehicle 104 are coupled with each other, the processor 122 will command the first aerial vehicle 102 and the second aerial vehicle 104 to perform a rotational motion. In the rotational motion, the first aerial vehicle 102 and the second aerial vehicle 104 will rotate in a circular direction/motion (clockwise or counter-clockwise as directed) about one another on the ground about a vertical axis "A" (the vertical axis "A" being perpendicular to the ground) until velocity for a take-off. is achieved. For instance, the first aerial vehicle 102 and the second aerial vehicle 104 may rotate about the connection point 118 clockwise or counter-clockwise, which will be located between the first aerial vehicle 102 and the second aerial vehicle 104. The first aerial vehicle 102 and the second aerial vehicle 104 will rotate at a small distance away from the connection point 118.

When the first aerial vehicle 102 and the second aerial vehicle 104 are rotating at the takeoff speed (commonly called rotation speed), the processor 122 will direct the first aerial vehicle 102 and the second aerial vehicle 104 to lift-off and climb at a flight altitude (or a desired flight altitude) in paired and rotational configuration (i.e., while the first aerial vehicle 102 and the second aerial vehicle 104 are coupled and rotating about one another). In some aspects, the processor 122, which had been previously programmed, will confirm whether the take-off speed is achieved, and drive the first aerial vehicle 102 and the second aerial vehicle 104 to initiate a climb to the flight altitude when the processor 122 determines that the "rotation speed" has been achieved. In this manner, the first aerial vehicle 102 and the second aerial vehicle 104 will perform the rotational take-off without requiring a standard linear conventional runway for standard straight line take-off. In such cases, the maximum runway requirement is a circle having a diameter equivalent to the gap 126 and any safety buffer as required. The processor 122 will command the first aerial vehicle 102 and the second aerial vehicle 104 to remain coupled until the first aerial vehicle 102 and the second aerial vehicle 104 have climbed to the desired flight altitude for decoupling.

Figure 2:
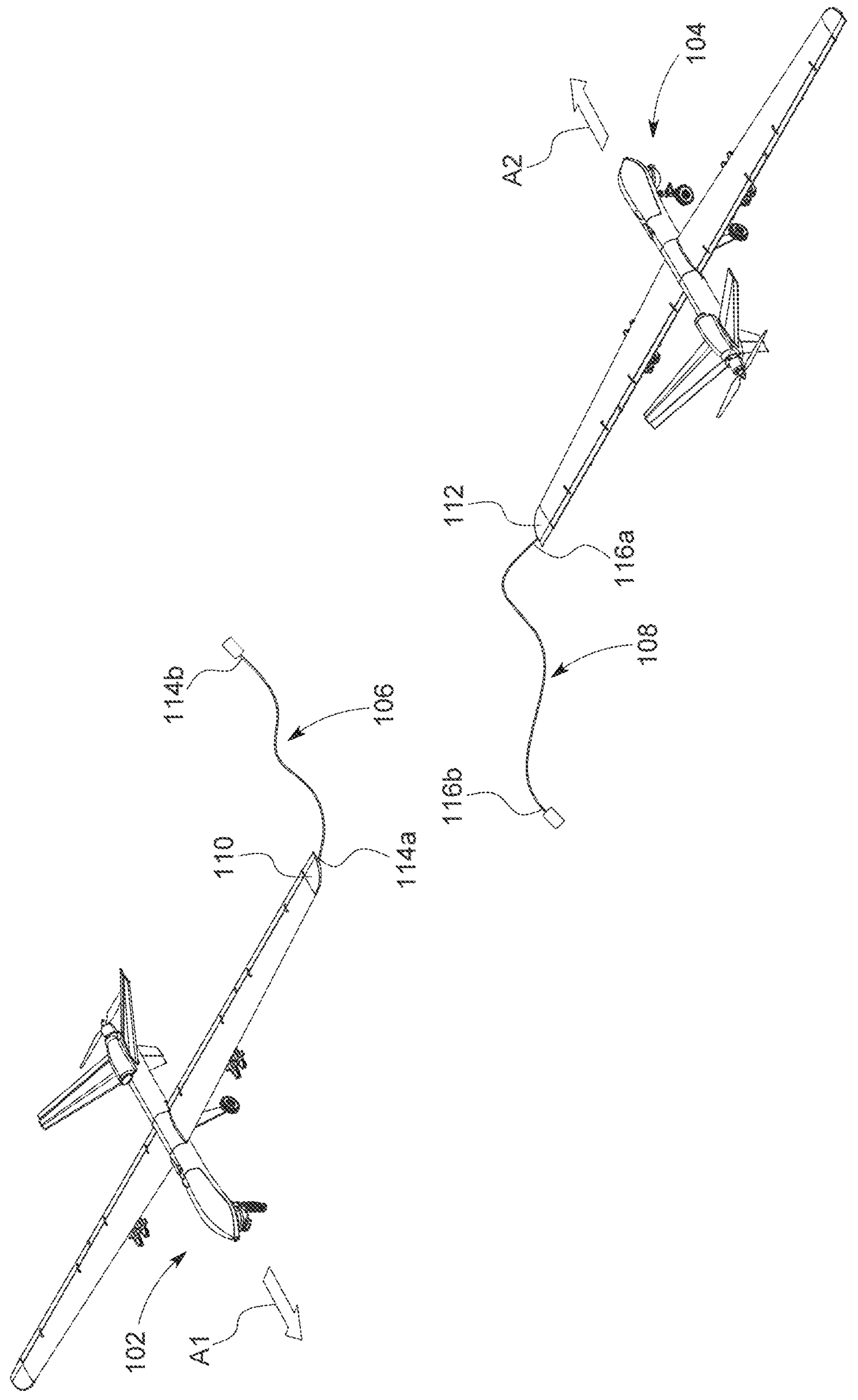
FIG. 2 depicts a second view of decoupling of the first aerial vehicle and the second aerial vehicle after take-off, in accordance with the present disclosure.

In further aspects, when the first aerial vehicle 102 and the second aerial vehicle 104 have climbed to the desired or preferred flight altitude, the processor 122 may be programmed to initiate decoupling of the first aerial vehicle 102 and the second aerial vehicle 104 from each other, as shown in FIG. 2. Stated another way, when the first aerial vehicle 102 and the second aerial vehicle 104 climb to the preferred flight altitude, the processor 122 may be programmed to initiate decoupling by causing the first connector distal end 114*b* to detach/disconnect from the second connector distal end 116*b* (e.g., decouple at the connection point 118). In some aspects, the processor 122 may automatically determine that the first aerial vehicle 102 and the second aerial vehicle 104 have climbed to the preferred or desired flight altitude, and will automatically decouple the first connector 106 and the second connector 108 based on a determination that the first aerial vehicle 102 and the second aerial vehicle 104 have climbed to the preferred or desired flight altitude. In alternative embodiments, the processor 122 will receive an instruction from the operator via the ground control station, and initiate the decoupling action based on the instructions received from the operator. In further aspects, the processor 122 will cause the decoupling based on any other input/instruction.

In further aspects, when the first aerial vehicle 102 may be separated from the second aerial vehicle 104 (or when the first connector 106 may be disconnected from the second connector 108), the processor 122 will have pre-programmed instructions that will instruct the first connector distal end 114*b* to retract towards the first aerial vehicle 102 (e.g., towards the first wingtip 110), and the second connector distal end 116*b* to retract towards the second aerial vehicle 104 (e.g., towards the second wingtip 112). When the first connector 106 and the second connector 108 include wires or cables, the first connector 106 and the second connector 108 will be spooled into the first aerial vehicle 102 and the second aerial vehicle 104 respectively, after the first connector distal end 114*b* is disconnected from the second connector distal end 116*b*.

In some aspects, responsive to instructions decoupling the first aerial vehicle 102 and the second aerial vehicle 104, the processor 122 will instruct the first aerial vehicle 102 and the second aerial vehicle 104 to transition from the paired and rotational flight configuration to an independent, uncoupled, and non-rotational forward motion (shown by arrows A1, A2 in FIG. 2), in order to complete their respective missions. For example, the processor 122, will direct via pre-programmed instructions, the first aerial vehicle 102 and the second aerial vehicle 104 to initiate level forward motion flight in either a preprogrammed direction (e.g., north, south, east, west etc.) which is responsive to the decoupling of the first and second aerial vehicles 102, 104. It may be appreciated that at the flight altitude (or the desired flight altitude), unstable aerial vehicles may achieve high momentum and tangential speed through the coupled rotation. This allows the individual aerial vehicles to become stable for separation and independent forward flight, as shown in FIG. 2.

In alternative aspects, the processor 122 will allow the first aerial vehicle 102 and the second aerial vehicle 104 to remain coupled after climb out to the flight altitude, and then perform the non-rotational forward motion, while the first aerial vehicle 102 may still be connected to the second aerial vehicle 104. In this case, the first aerial vehicle 102 and the second aerial vehicle 104 may fly side by side in the forward motion while the first aerial vehicle 102 and the second aerial vehicle 104 may still be coupled with each other.

After the missions associated with the first aerial vehicle 102 and the second aerial vehicle 104 have been completed or terminated, the processor 122 will initiate the rotational landing of the first aerial vehicle 102 and the second aerial vehicle 104. To enable the rotational landing, the processor 122 may first determine that the first aerial vehicle 102 and the second aerial vehicle 104 have completed their respective missions. Based on the determination, the processor 122 will initiate the rotational landing. In other aspects, the processor 122 may obtain instructions (e.g., a second instruction) from the operator via the ground control station, and may initiate the rotational landing based on the obtained second instruction.

Figure 3:
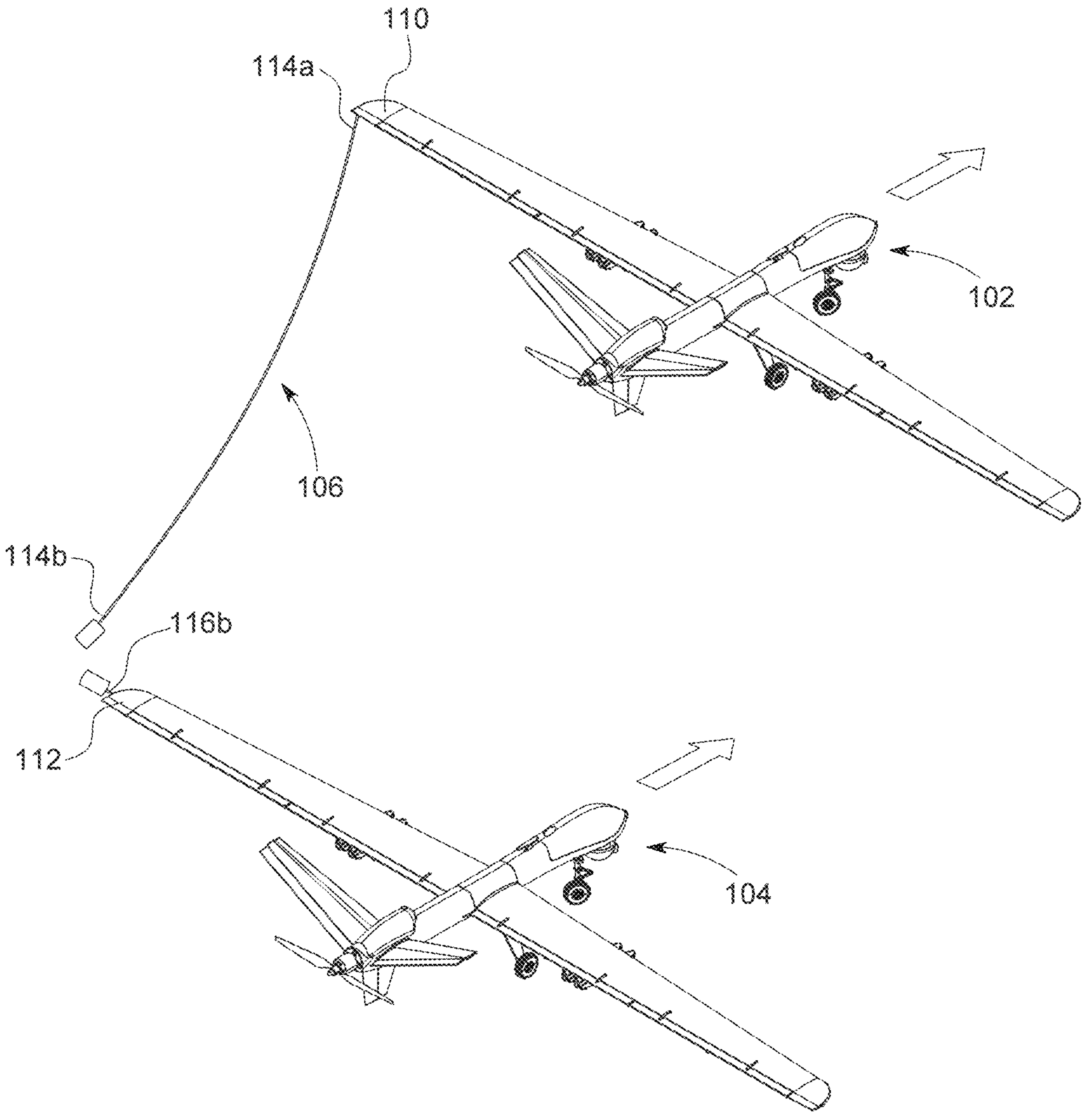
FIG. 3 depicts a third view of coupling of the first aerial vehicle and the second aerial vehicle for a rotational landing, in accordance with the present disclosure.
Figure 4:
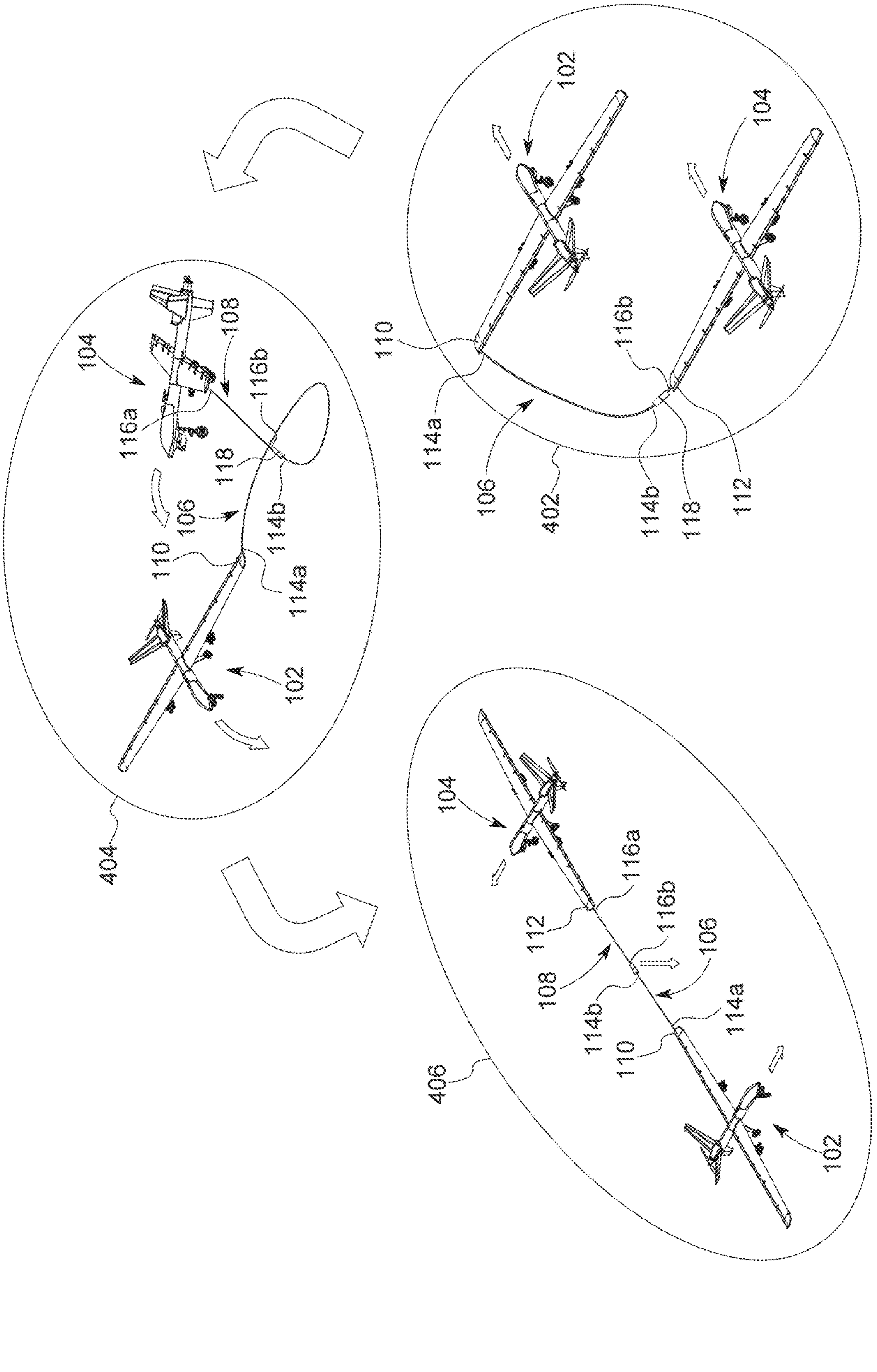
FIG. 4 depicts a sequence of actions performed to execute the rotational landing of the first aerial vehicle and the second aerial vehicle, in accordance with the present disclosure.

Responsive to initiating the rotational landing (e.g., after obtaining the second instructions), the processor 122 will cause the first aerial vehicle 102 and the second aerial vehicle 104 to "recouple" with each other, via the first connector 106 and the second connector 108, allowing the first aerial vehicle 102 and the second aerial vehicle to resume the paired rotational flight (i.e., the paired and rotational configuration) around the vertical axis "A" and then perform the rotational landing vertically. In some aspects of the invention, in order to recouple the first aerial vehicle 102 and the second aerial vehicle 104, the first aerial vehicle 102 will position itself and align with the second aerial vehicle 104. When the first aerial vehicle 102 is located above and aligned with the second aerial vehicle 104, the processor 122 will lower the first connector 106 towards the second connector 108 (like what is currently performed in an aerial refueling procedure), as shown in FIG. 3. The processor 122 will then initiate the automatic coupling of the first aerial vehicle 102 and the second aerial vehicle 104 by attaching the first connector 106 with the second connector 108 (e.g., by attaching the first connector distal end 114*b* and the second connector distal end 116*b*). An example of the coupled first aerial vehicle 102 and the second aerial vehicle 104 is shown in view 402 of FIG. 4.

When the first aerial vehicle 102 is coupled to the second aerial vehicle 104, the processor 122 will communicate the instructions so that the first aerial vehicle 102 and the second aerial vehicle 104 will be positioned for a landing position. The landing position would be similar to the take-off position as previously described. For example, in preparation for landing, the first aerial vehicle 102 and the second aerial vehicle 104 will be positioned in opposing directions and positioned in a parallel plane to each other. In some aspects of the invention, when the first aerial vehicle 102 and the second aerial vehicle 104 are coupled, the first aerial vehicle 102 and the second aerial vehicle 104 follow each other in a loiter pattern and slowly become off phase until they are traveling in the opposite directions of each other (as shown in a view 404 of FIG. 4).

In some aspects of the invention, when the first aerial vehicle 102 and the second aerial vehicle 104 are coupled and positioned opposite to each other (as shown in a view 406 of FIG. 4), the processor 122 will transition the first aerial vehicle 102 and the second aerial vehicle 104 from the non-rotational forward motion to the rotational motion. In the rotational motion, the first aerial vehicle 102 and the second aerial vehicle 104 will rotate about one another and about the vertical axis at a predetermined speed.

Thereafter, the processor 122 will initiate a descent of the first aerial vehicle 102 and the second aerial vehicle 104 towards the landing area in order to complete the rotational landing. To complete the rotational landing, the first aerial vehicle 102 and the second aerial vehicle 104 will throttle down and thereby decelerate from flight speed while in the paired and rotational configuration. Once on the ground, the first and second aerial vehicles 102, 104 will be decoupled from each other (i.e., the first connector distal end 114*b* and the second connector distal end 116*b* may be disconnected from each other), as needed.

Although the description above describes an aspect in which the first aerial vehicle 102 and the second aerial vehicle 104 may be coupled for rotational take-off and landing, the present disclosure is not limited to such an aspect. In alternative aspects, there may be one or more additional aerial vehicles that may be coupled with the first aerial vehicle 102 and the second aerial vehicle 104 for rotational take-off and landing. The additional aerial vehicles may be autonomous unmanned aerial vehicles or remotely controlled unmanned aerial vehicles like the first aerial vehicle 102 and the second aerial vehicle 104. The first aerial vehicle 102, the second aerial vehicle 104, and the additional aerial vehicles may be coupled with each other to form a single coupled/paired system, to perform the rotational take-off and the rotational landing about a vertical axis "A", in the same manner as described above.

Figure 5:
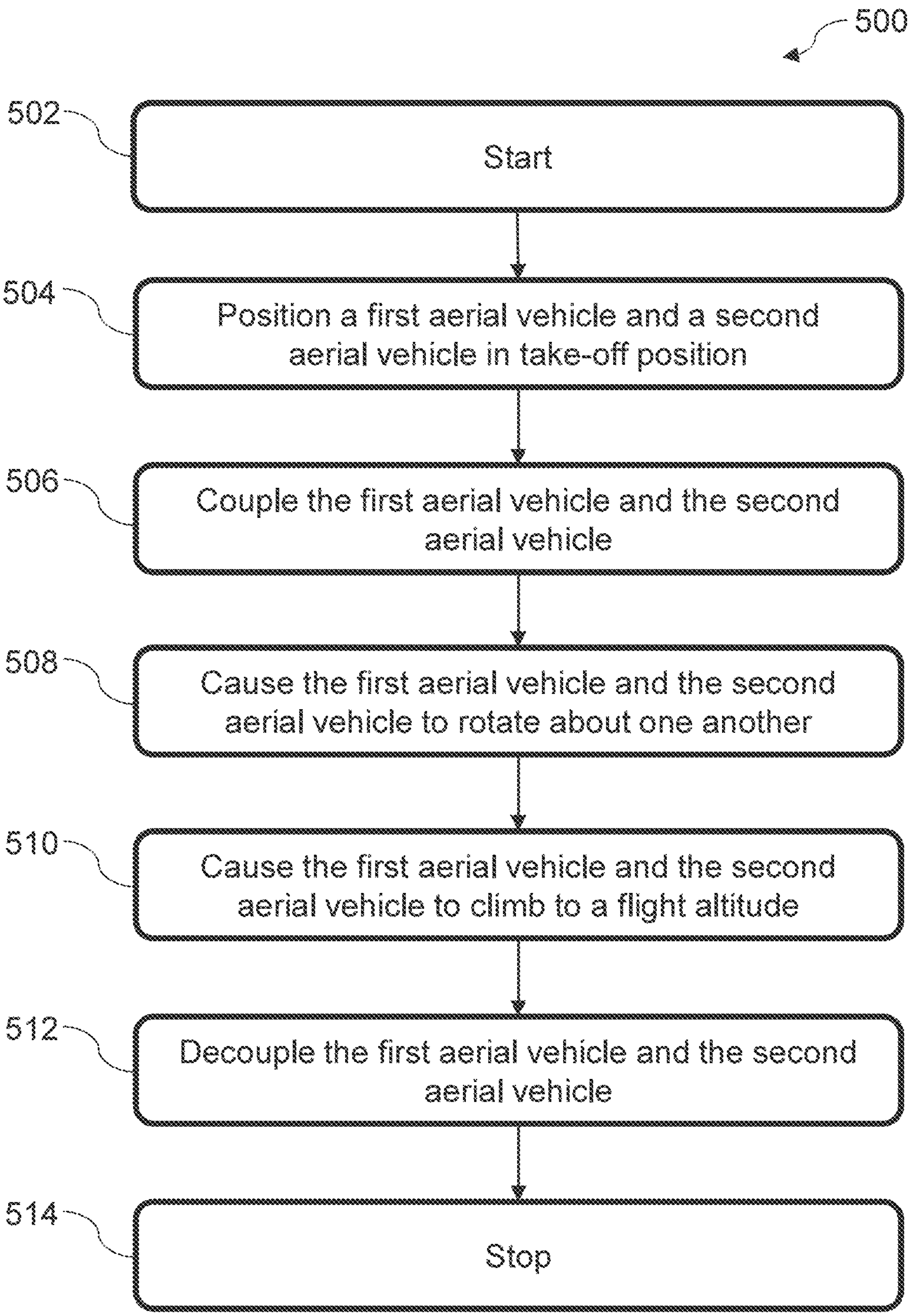
FIG. 5 is a flow diagram of an example first method to perform the rotational take-off of the first aerial vehicle and the second aerial vehicle, in accordance with embodiments of the invention.

FIG. 5 is a flow diagram of an example first method 500 to perform the rotational takeoff of the first aerial vehicle 102 and the second aerial vehicle 104, in accordance with embodiments of the invention. The following process is exemplary and not confined to the steps described hereafter. Moreover, alternative embodiments may include more or fewer steps than are shown or described herein and may include these steps in a different order than the order described in the following example embodiments.

Referring to FIG. 5, at step 502, the method 500 commences. At step 504, the method 500 includes positioning, by one or more processors, the first aerial vehicle 102 and the second aerial vehicle 104 in the take-off position. As mentioned above, in the take-off position, the first aerial vehicle 102 and the second aerial vehicle 104 may be positioned in the first direction and the second direction (that is opposite to the first direction), and maintain the gap 126.

At step 506, the method 500 may include coupling the first aerial vehicle 102 and the second aerial vehicle 104 via the first connector 106 and the second connector 108, when the first aerial vehicle 102 and the second aerial vehicle 104 may be in the take-off position. At step 508, the method 500 may include causing/instructing the first aerial vehicle 102 and the second aerial vehicle 104 to rotate about one another about a vertical axis on ground until a take-off speed is achieved.

At step 510, the method 500 will include causing/instructing the first aerial vehicle 102 and the second aerial vehicle 104 to climb to the flight altitude after the take-off speed is achieved. At step 512, the method 500 will include causing/instructing the first aerial vehicle 102 and the second aerial vehicle 104 to decouple when the first aerial vehicle 102 and the second aerial vehicle 104 climb to the flight altitude and flight speed.

The method ends at step 514.

Figure 6:
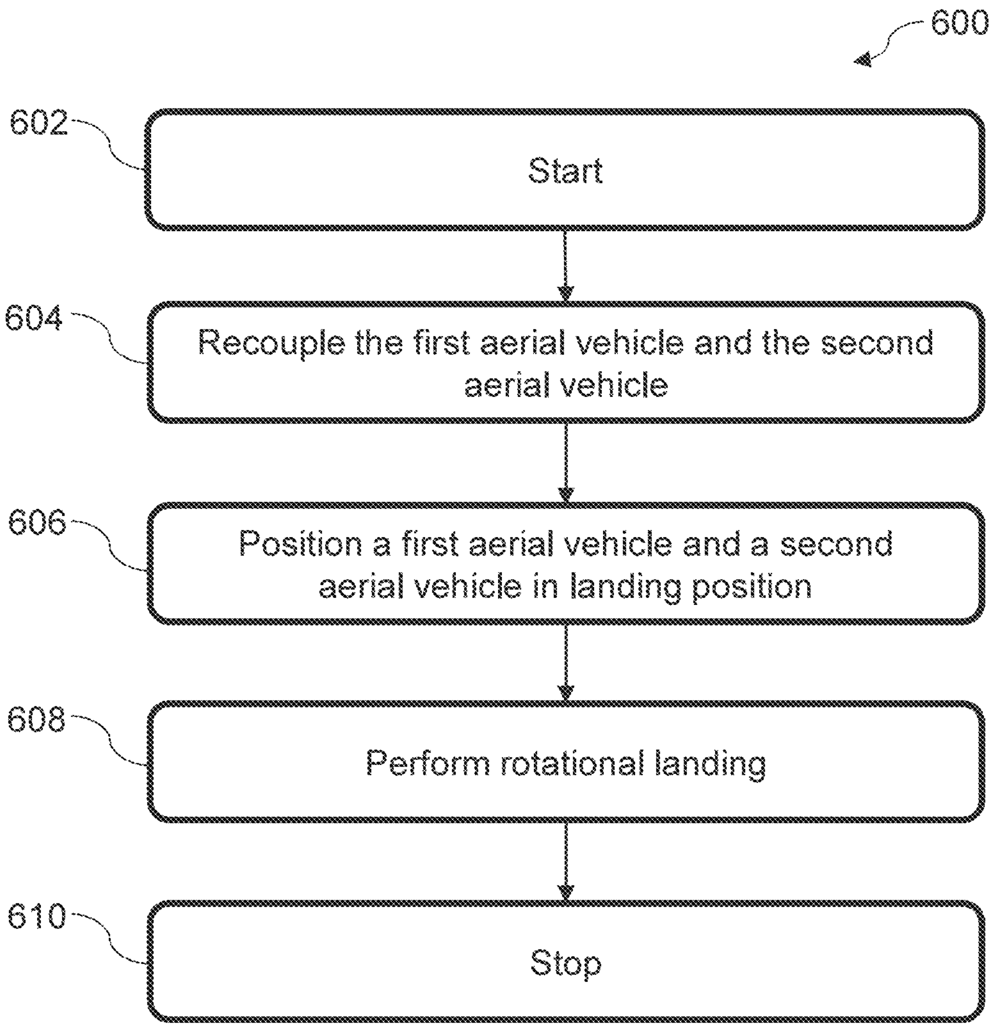
FIG. 6 is a flow diagram of an example second method to perform the rotational landing of the first aerial vehicle and the second aerial vehicle, in accordance with embodiments of the invention.

FIG. 6 is a flow diagram of an example second method 600 to perform the rotational landing of the first aerial vehicle 102 and the second aerial vehicle 104, in accordance with embodiments of the invention. The following process is exemplary and not confined to the steps described hereafter. Moreover, alternative embodiments may include more or fewer steps than are shown or described herein and may include these steps in a different order than the order described in the following example embodiments.

Referring to FIG. 6, at step 602, the method 600 commences. At step 604, the method 600 includes recoupling the first aerial vehicle 102 to the second aerial vehicle 104, via the first connector 106 and the second connector 108, in order to prepare for and allow for rotational landing. At step 606, the method 600 includes positioning the first aerial vehicle 102 and the second aerial vehicle 104 in the landing position. As mentioned above, in the landing position, the first aerial vehicle 102 and the second aerial vehicle 104 are positioned in the first direction and the second direction respectively, and the first and second aerial vehicles 102, 104 will have and maintain a small gap therebetween. At step 608, the method 600 will include performing the rotational landing in which the coupled first aerial vehicle 102 and second aerial vehicle 104 will rotate about each other around a vertical axis and descend towards the landing site, or ground.

The method 600 ends at step 610.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

The claimed invention is:

1. A system for rotational take-off and landing of aerial vehicles, comprising:

a. a first aerial vehicle and a second aerial vehicle;

b. a first connector having a first connector proximal end and a first connector distal end, wherein the first connector proximal end is attached to the first aerial vehicle; and c. a second connector having a second connector proximal end and a second connector distal end, wherein the second connector proximal end is attached to the second aerial vehicle, wherein the first aerial vehicle and the second aerial vehicle are configured to be coupled to each other using the first connector distal end and the second connector distal end, and wherein the first aerial vehicle and the second aerial vehicle are configured to be coupled to each other to perform a rotational take-off and a rotational landing about a vertical axis, wherein d. the first connector is configured to decouple from the second connector after the first and second vehicles have climbed to a desired flight altitude.

2. The system of claim 1, wherein the first connector and the second connector are cables.

3. The system of claim 1, wherein the first connector and the second connector are fixed structures.

4. The system of claim 1, further comprising:

a first processor associated with the first aerial vehicle; and a second processor associated with the second aerial vehicle.

5. The system of claim 4, wherein the first processor and the second processor are each configured to obtain a first instruction to perform the rotational take-off of the first aerial vehicle and the second aerial vehicle.

6. The system of claim 5, wherein the first processor and the second processor are configured to initiate, responsive to obtaining the first instruction, the first aerial vehicle and the second aerial vehicle to perform a rotational motion in which the first aerial vehicle and the second aerial vehicle rotate about one another on ground until a take-off speed has been achieved, while the first aerial vehicle and the second aerial vehicle are coupled.

7. The system of claim 6, wherein the first processor and the second processor are further configured to instruct the first aerial vehicle and the second aerial vehicle to continue the rotational motion and climb to a desired flight altitude subsequent to take-off speed being achieved.

8. The system of claim 7, wherein the first processor and the second processor are further configured to instruct the first aerial vehicle and the second aerial vehicle to remain coupled until the first aerial vehicle and the second aerial vehicle have climbed to the desired flight altitude.

9. The system of claim 8, wherein the first processor and the second processor are further configured to instruct the first aerial vehicle and the second aerial vehicle to decouple after the first aerial vehicle and the second aerial vehicle have climbed to the desired flight altitude.

10. The system of claim 9, wherein the first processor and the second processor are further configured to instruct the first connector distal end to retract towards the first aerial vehicle and the second connector distal end to retract towards the second aerial vehicle when the first connector and the second connector are disconnected.

11. The system of claim 9, wherein the first processor and the second processor are further configured to instruct the first aerial vehicle and the second aerial vehicle to transition from the rotational take-off motion to an independent, uncoupled, and non-rotational forward motion when the first connector and the second connector are disconnected.

12. The system of claim 11, wherein the first processor and the second processor are further configured to:

a. obtain a second instruction to perform the rotational landing;

b. instruct the first connector distal end and the second connector distal end to reconnect, responsive to obtaining the second instruction;

c. instruct the first aerial vehicle and the second aerial vehicle to transition from the independent, uncoupled, and non-rotational forward motion to the rotational motion in which the first aerial vehicle and the second aerial vehicle rotate about one another and about the vertical axis; and d. instruct the first aerial vehicle and the second aerial vehicle to descend to a landing site or ground to complete the rotational landing.

13. The system of claim 8, wherein the first processor and the second processor are further configured to instruct the first aerial vehicle and the second aerial vehicle to remain coupled after the first aerial vehicle and the second aerial vehicle have climbed to the desired flight altitude, and then transition from the rotational motion to a non-rotational forward motion while the first connector and the second connector are connected.

14. A method for rotational take-off and landing of aerial vehicles, comprising:

a. positioning, by one or more processors, a first aerial vehicle in a first direction and a second aerial vehicle in a second direction, wherein the first direction is opposite to the second direction;

b. coupling, by the one or more processors, the first aerial vehicle and the second aerial vehicle via a first connector and a second connector when the first aerial vehicle is positioned in the first direction and the second aerial vehicle is positioned in the second direction, wherein the first connector is associated with the first aerial vehicle and the second connector is associated with the second aerial vehicle;

c. instructing, by the one or more processors, the first aerial vehicle and the second aerial vehicle to rotate about one another about a vertical axis on ground until a take-off speed is achieved; instructing, by the one or more processors, the first aerial vehicle and the second aerial vehicle to climb to a desired flight altitude after the take-off speed is achieved; and d. instructing, by the one or more processors, the first aerial vehicle and the second aerial vehicle to decouple when the first aerial vehicle and the second aerial vehicle climb to the flight altitude.

* * * * *